(12) United States Patent
Gajda et al.

(10) Patent No.: US 7,799,729 B2
(45) Date of Patent: Sep. 21, 2010

(54) REFORMING CATALYST

(75) Inventors: Gregory J. Gajda, Mt. Prospect, IL (US); Mark Paul Lapinski, Aurora, IL (US); Jeffry Thurston Donner, Aurora, IL (US); Simon Russell Bare, Wheaton, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/391,035

(22) Filed: Feb. 23, 2009

(65) Prior Publication Data

US 2010/0216630 A1 Aug. 26, 2010

(51) Int. Cl.
*B01J 23/00* (2006.01)
*B01J 21/00* (2006.01)
*B01J 20/00* (2006.01)
*B01J 29/00* (2006.01)
*B01J 27/00* (2006.01)

(52) U.S. Cl. .................... 502/327; 502/66; 502/73; 502/74; 502/87; 502/230; 502/231; 502/238; 502/239; 502/242; 502/258; 502/259; 502/260; 502/261; 502/262; 502/263; 502/326; 502/332; 502/333; 502/334; 502/335; 502/336; 502/337; 502/338; 502/339; 502/349; 502/350; 502/351; 502/352; 502/355; 502/415; 502/439

(58) Field of Classification Search .............. 502/66, 502/73, 74, 87, 230, 231, 238, 239, 242, 502/258, 259, 260, 261, 262, 263, 326, 327, 502/332, 333, 334, 335, 336, 337, 338, 339, 502/349, 350, 351, 352, 355, 415, 439
See application file for complete search history.

(56) References Cited

U.S. PATENT DOCUMENTS

| | | | |
|---|---|---|---|
| 3,892,657 A | 7/1975 | Wilhelm | |
| 4,487,848 A | 12/1984 | Robinson et al. | |
| 4,522,935 A | 6/1985 | Robinson et al. | |
| 4,529,505 A | 7/1985 | Robinson et al. | |
| 4,588,495 A * | 5/1986 | Franck et al. ............. | 208/65 |
| 4,716,143 A | 12/1987 | Imai | |
| 4,737,262 A * | 4/1988 | Franck et al. ............. | 208/65 |
| 5,128,300 A * | 7/1992 | Chao et al. ............... | 502/227 |
| 5,211,838 A | 5/1993 | Staubs et al. | |
| 5,221,463 A | 6/1993 | Kamienski et al. | |
| 5,520,796 A * | 5/1996 | Chen et al. ............... | 208/65 |
| 5,559,068 A * | 9/1996 | Chen et al. ............... | 502/213 |
| 5,565,090 A | 10/1996 | Gosling et al. | |
| 5,677,260 A | 10/1997 | Dongara et al. | |
| 5,858,908 A | 1/1999 | Bogdan et al. | |
| 5,879,537 A | 3/1999 | Peters | |
| 5,883,032 A | 3/1999 | Bogdan et al. | |
| 5,885,443 A | 3/1999 | Bogdan et al. | |
| 5,958,216 A | 9/1999 | Glover | |
| 6,013,173 A | 1/2000 | Bogdan | |
| 6,034,018 A | 3/2000 | Sechrist et al. | |
| 6,036,845 A | 3/2000 | Funk et al. | |
| 6,106,696 A | 8/2000 | Fecteau et al. | |
| 6,153,090 A | 11/2000 | Le Peltier et al. | |
| 6,451,199 B1 | 9/2002 | Cauffriez et al. | |
| 6,495,487 B1 * | 12/2002 | Bogdan .................... | 502/227 |
| 6,498,280 B1 | 12/2002 | Uzio et al. | |
| 6,511,593 B1 | 1/2003 | Le Peltier et al. | |
| 6,635,598 B2 * | 10/2003 | Dongara et al. ............ | 502/226 |
| 6,809,061 B2 * | 10/2004 | Bogdan et al. ............ | 502/227 |
| 6,872,300 B1 * | 3/2005 | Galperin et al. ............ | 208/138 |
| 6,884,340 B1 | 4/2005 | Bogdan | |
| 7,037,871 B1 | 5/2006 | Galperin et al. | |
| 2004/0043896 A1 | 3/2004 | Cauffriez et al. | |
| 2006/0013763 A1 | 1/2006 | Baird et al. | |
| 2006/0102520 A1 | 5/2006 | Lapinski et al. | |
| 2006/0213811 A1 | 9/2006 | Clay et al. | |
| 2006/0252971 A1 | 11/2006 | Pilliod et al. | |

FOREIGN PATENT DOCUMENTS

| | | |
|---|---|---|
| AU | B-28357/92 | 5/1993 |
| EP | 0 098 181 A1 | 1/1984 |
| EP | 0 457 640 A1 | 11/1991 |
| EP | 0 471 599 A1 | 2/1992 |
| EP | 0 542 613 A1 | 5/1993 |

(Continued)

OTHER PUBLICATIONS

English Abstract of EP 542613 A1 published May 19, 1993.

(Continued)

*Primary Examiner*—Cam N Nguyen
(74) *Attorney, Agent, or Firm*—Maryann Maas

(57) ABSTRACT

In one embodiment, a reforming catalyst can include indium, tin, and a catalytically effective amount of a group VIII element for one or more reforming reactions. Typically, at least about 25%, by mole, of the indium is an In(3+) species based on the total moles of indium after exposure for about 30 minutes in an atmosphere including about 100% hydrogen, by mole, at a temperature of about 565° C. Usually, no more than about 25%, by mole, of the tin is a Sn(4+) species based on the total moles of tin after exposure for about 30 minutes in an atmosphere including about 100% hydrogen, by mole, at a temperature of about 565° C.

20 Claims, No Drawings

FOREIGN PATENT DOCUMENTS

| | | |
|---|---|---|
| EP | 0 542 625 A1 | 5/1993 |
| GB | 2 353 734 A | 3/2001 |
| WO | WO-93/12202 | 6/1993 |
| WO | WO-2004/039720 A2 | 5/2004 |
| WO | WO-2005/105957 A1 | 11/2005 |

OTHER PUBLICATIONS

English Abstract of EP 098181 A1 published Jan. 11, 1984.
English Abstract of EP 457640 A1 published Nov. 21, 1991.
English Abstract of EP 471599 A1 published Feb. 19, 1992.
English Abstract of EP 542625 A1 published May 19, 1993.
D.E. Sayers, Report of the International XAFS Society Standards and Criteria Committee, Adopted Jul. 25, 2000, p. 15.
U.S. Appl. No. 12/104,482 to Lapinski et al., Process and System for the Transfer of a Metal Catalyst Component From One Particle to Another, filed Apr. 17, 2008, p. 25.

\* cited by examiner

REFORMING CATALYST

FIELD OF THE INVENTION

This invention generally relates to a reforming catalyst that can be used in a hydroconversion process.

DESCRIPTION OF THE RELATED ART

Numerous hydrocarbon conversion processes can be used to alter the structure or properties of hydrocarbon streams. Generally, such processes include: isomerization from straight chain paraffinic or olefinic hydrocarbons to more highly branched hydrocarbons, dehydrogenation for producing olefinic or aromatic compounds, dehydrocyclization to produce aromatics and motor fuels, alkylation to produce commodity chemicals and motor fuels, transalkylation, and others.

Typically such processes use catalysts to promote hydrocarbon conversion reactions. Often, it is desirable to develop catalysts with different properties, such as activity and selectivity, to process various hydrocarbon feeds. Thus, discovering catalysts with new properties can be beneficial.

SUMMARY OF THE INVENTION

In one embodiment, a reforming catalyst can include indium, tin, and a catalytically effective amount of a group VIII element for one or more reforming reactions. Typically, at least about 25%, by mole, of the indium is an In(3+) species based on the total moles of indium after exposure for about 30 minutes in an atmosphere including about 100% hydrogen, by mole, at a temperature of about 565° C. Usually, no more than about 25%, by mole, of the tin is a Sn(4+) species based on the total moles of tin after exposure for about 30 minutes in an atmosphere including about 100% hydrogen, by mole, at a temperature of about 565° C.

In another preferred embodiment, a reforming catalyst may include tin. Typically, at least about 45%, by mole, of the tin is a Sn(0) species and no more than about 30%, by mole, of the tin is a Sn(4+) species based on the total moles of tin after exposure for about 30 minutes in an atmosphere including about 100% hydrogen, by mole, at a temperature of about 565° C.

In yet another preferred embodiment, a reforming catalyst can include a catalytically effective amount of a group VIII element for catalyzing one or more reforming reactions, an effective amount of a group IVA element, and an effective amount of a reducing element. Usually, the coordination number of the reducing element and group VIII element is greater than 0 as determined at room temperature after exposure to an atmosphere of about 100%, by mole, hydrogen at a temperature of about 565° C.

Therefore, the embodiments disclosed herein can provide a catalyst having different properties for facilitating hydroconversion reactions and flexibility with processing different feeds.

DEFINITIONS

As used herein, the term "zone" can refer to an area including one or more equipment items and/or one or more sub-zones. Equipment items can include one or more reactors or reactor vessels, heaters, separators, exchangers, pipes, pumps, compressors, and controllers. Additionally, an equipment item, such as a reactor or vessel, can further include one or more zones or sub-zones.

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the hydrocarbon molecule.

As used herein, the term "metal" generally means an element that forms positive ions when its compounds are in solution.

As used herein, the term "catalytically effective amount" generally means an amount added to a catalyst support to facilitate the reaction of at least one compound of a hydrocarbon stream. Typically, a catalytically effective amount is at least about 0.005%, preferably about 0.05%, and optimally about 0.10%, based on the weight of the catalyst.

As used herein, the term "promotionally effective amount" generally means an amount on a catalyst support to increase catalytic performance in a conversion of a hydrocarbon stream to, e.g., facilitate the reaction of at least one compound in the stream.

Typically, a promotionally effective amount is at least about 0.005%, preferably about 0.05%, and optimally about 0.10%, based on the weight of the catalyst.

As used herein, the term "effective amount" includes amounts that can improve the catalytic performance and/or facilitate the reaction of at least one compound of a hydrocarbon stream.

As used herein, the term "conditions" generally means process conditions such as temperature, reaction time, pressure, and space velocity.

As used herein, the term "support" generally means a porous carrier material that can optionally be combined with a binder before the addition of one or more additional catalytically active components, such as a noble metal, or before subjecting the support to subsequent processes such as oxychlorination or reduction.

As used herein, the term "halogen component" generally means a halide ion or any molecule that contains a halide. A halogen can include chlorine, fluorine, bromine, or iodine. As an example, a halogen component can include a halogen, a hydrogen halide, a halogenated hydrocarbon, and a compound including a halogen and a metal. Typically, a halogen component is comprised in a catalyst.

As used herein, the term "halogen-containing compound" generally means any molecule that contains a halide. A halogen can include chlorine, fluorine, bromine, or iodine. Typically, a halogen-containing compound can be part of a gas stream and include compounds such as chlorine, hydrogen chloride, or perchloroethylene, and may provide a halogen component to a catalyst.

As used herein, the term "catalyst precursor" generally means a support having the addition of one or more catalytically active components, such as a noble metal, but not subjected to subsequent processes, such as reducing or sulfiding, to complete the manufacture of the catalyst. However, in some instances, a catalyst precursor may have catalytic properties and can be used as a "catalyst".

As used herein, the term "room temperature" generally means a temperature of about 20-about 25° C.

DETAILED DESCRIPTION

The catalyst disclosed herein can include a support and one or more additional components that can be incorporated into the support during its formation or incorporated afterwards. Typically, the catalyst can include the support, binder, and added components, which may be one or more metals and optionally one or more halogen components. After deposition of the metals, a high temperature calcination can create varying oxidation states of the one or more deposited metals for imparting the desired selectivity and activity performance for various carbon feeds.

Generally, the support can be formed by an oil-drop method or extruded, although other methods can be utilized. The support can include a porous carrier material, such as a refractory inorganic oxide or a molecular sieve, and a binder in a weight ratio of about 1:99-about 99:1, preferably about 10:90-about 90:10. The carrier material can include:

(1) a refractory inorganic oxide such as an alumina, a magnesia, a titania, a zirconia, a chromia, a zinc oxide, a thoria, a boria, a silica-alumina, a silica-magnesia, a chromia-alumina, an alumina-boria, or a silica-zirconia;
(2) a ceramic, a porcelain, or a bauxite;
(3) a silica or a silica gel, a silicon carbide, a clay or a silicate synthetically prepared or naturally occurring, which may or may not be acid treated, for example an attapulgus clay, a diatomaceous earth, a fuller's earth, a kaolin, or a kieselguhr;
(4) a crystalline zeolitic aluminosilicate, such as an X-zeolite, a Y-zeolite, a mordenite, a β-zeolite, an Ω-zeolite or an L-zeolite, either in the hydrogen form or most preferably in nonacidic form with one or more alkali metals occupying the cationic exchangeable sites;
(5) a non-zeolitic molecular sieve, such as an aluminophosphate or a silico-alumino-phosphate; or
(6) a combination of one or more materials from one or more of these groups.

In one preferred embodiment, the porous carrier is an alumina, such as a gamma alumina. The binder can include an alumina, a magnesia, a zirconia, a chromia, a titania, a boria, a thoria, a phosphate, a zinc oxide, a silica, or a mixture thereof. A higher density support may result in higher levels of tin oxidation species after a high temperature treatment.

The catalyst may contain one or more other components added during the formation of the support and/or incorporated afterwards. These components can be one or more metals or non-metals and include: (1) a group VIII element, (2) a promoter such as a group IVA element, (3) a reducing element, such as one or more group IIIA elements or other elements, and (4) a halogen component. Optionally, the catalyst may also contain one or more group IA and IIA metals (alkali and alkaline-earth metals) in about 0.01-about 5%, by weight, based on the weight of the catalyst.

Preferably, the group VIII element is platinum and the catalyst contains a catalytically effective amount. Typically, the catalyst contains about 0.01-about 2%, by weight, of the group VIII element, preferably platinum, based on the weight of the catalyst.

A promoter can be a group IVA element and/or other elements. A preferable group IVA element is tin, germanium, or lead, more preferably tin. Yet another promoter that optionally can be included is rhenium; a rare earth metal, such as cerium, lanthanum, and/or europium; phosphorus; nickel; iron; tungsten; molybdenum; titanium; zinc; or cadmium. Also, a combination of these elements can be used. Generally, the catalyst contains about 0.01-about 5%, by weight, based on the weight of the catalyst. The group IVA element or other promoter can be present in the form of an oxide or a chloride. Although not wanting to be bound by theory, it is believed such elements as tin can have primarily metal oxygen bonds, and may be one or more surface oxides as opposed to a bulk oxide, such as $SnO_2$.

The catalyst can also contain a promotionally effective amount of a reducing element. The reducing element can be at least one of a group IIIA element, preferably indium, iron, chromium, cobalt, nickel, lead, cadmium, thallium, selenium, and europium. Typically, the catalyst contains zero up to no more than about 1%, by weight, of the group IIIA element, preferably indium, based on the weight of the catalyst. If indium, indium can be present as a metal on the catalyst or as one or more compounds, such as indium oxide, an alloy or a mixture of platinum, tin and indium, or indium chloride. Preferably, the catalyst has no more than about 0.6%, by weight, indium based on the weight of the catalyst. Although not wanting to be bound by theory, it is believed reducing elements such as indium can have primarily metal oxygen bonds, and may be one or more surface oxides as opposed to a bulk oxide.

Generally, the reducing element acts as a promoter to change the catalyst performance by, e.g., facilitating the catalytic activity of the group VIII element. Although not wanting to be bound by theory, the reducing element can achieve increased reduction of the group VIII element, as well as the group IVA element. Typically, the group VIII element is platinum and the group IVA element is tin.

The halogen component can be included in the catalyst and can be fluorine, chlorine, bromine, iodine, astatine or a combination thereof. Preferably the halogen component is chlorine. The catalyst can contain typically about 0.1-about 10%, preferably about 0.5-about 2.0%, and optimally about 0.7-about 1.3%, by weight, of the halogen component, preferably chlorine, based on the weight of the catalyst.

By using a high temperature calcination, the activity and selectivity of the catalyst can be altered. Particularly, the oxidation states of the one or more metals can be altered and/or an interaction between the reducing element and group VIII metal can be created. In one preferred embodiment, indium(3+) may be present in an amount of at least about 25%, by mole, based on the total moles of indium present, and no more than about 25%, by mole, tin(4+) based on the total moles of tin present in the catalyst as measured at about 565° C. in an atmosphere, including about 100%, by mole hydrogen. Although not wanting to be bound by theory, it is believed that the high temperature calcination can increase the amounts of indium(3+) as opposed to indium(1+), while reducing the amounts of Sn(4+) as compared to the other tin species, namely Sn(2+) and Sn(0). As such, these properties can provide a catalyst with desired activity and selectivity properties. Also, the defined oxidation states of indium and tin may only be present at an elevated temperature, e.g., about 565° C. as opposed to a lower temperature, e.g., room temperature. Although not wanting to be bound by theory, the indium(3+)/indium(1+) reduction potential can be sufficient to reduce Sn(2+) to Sn(0) if the indium is reduced during the high temperature treatment by the following reaction:

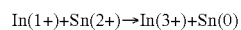

$$In(1+)+Sn(2+) \rightarrow In(3+)+Sn(0)$$

which can be thermodynamically favored to produce In(3+) and Sn(0).

In another desired embodiment, if the promoter is tin, preferably the tin is present in an amount of at least about 45%, preferably at least about 50%, by mole, tin(0), and no more than about 30%, preferably no more than about 25%, by mole, tin(4+) based on the total moles tin present on the catalyst as measured at about 565° C. in an atmosphere including about 100%, by mole, hydrogen. Although not wanting to be bound by theory, it is believed that the high temperature calcination can increase the amount of tin(0) and decrease the amount of tin(4+) while increasing the amounts of other tin species. As such, these properties can provide a catalyst with desired activity and selectivity properties. Moreover, the defined oxidation states of tin may only be present at an elevated temperature, e.g., about 565° C. as opposed to a lower temperature, e.g., room temperature.

In yet another embodiment, the reducing element and group VIII element, such as indium and platinum respectively, can demonstrate a coordination number at least greater than 0, preferably at least about 0.1. Although not wanting to be bound by theory, it is believed that such a value indicates a bond, such as a covalent bond, between the indium and platinum atoms. Generally, the indium can be present in an oxidation state of indium(3+). Other reducing elements may used and be present in the following oxidation states: Fe(2+), Cr(2+), Co(2+), Ni(2+), Pb(2+), Cd(2+), Tl(3+), Se(2−), and Eu(2+). Additionally, it is desirable if a group IVA, such as tin, and a group VIII element, such as platinum has a coordination number no more than about 1.0. The coordination numbers can be determined by extended x-ray absorption fine structure (EXAFS) scan, as described below, at room temperature after exposure to an atmosphere including about 100%, by mole, hydrogen at about 565° C.

The supports can be formed into spheres or extrudates optionally with one or more components. The metal components, such as the one or more group VIII elements, the promoters, and/or the reducing elements, may be incorporated in the support in any suitable manner, such as coprecipitation, ion-exchange or impregnation. However, it is generally preferable for a high temperature calcination to occur between impregnation of the reducing element and the group VIII metal. A preferred method of preparing the catalyst can involve impregnating a porous carrier material with a soluble, decomposable group VIII compound. As an example, a platinum metal may be added by comingling the support with an aqueous solution of chloroplatinic acid. Other water-soluble compounds or complexes of group VIII metals may be employed in impregnating solutions and include platinum nitrate, platinum sulfite acid, ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, chloropalladic acid, palladium nitrate, palladium sulfate, diamminepalladium (II) hydroxide, tetraamminepalladium (II) chloride, hexaamminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), chloroiridic acid, potassium or sodium chloroiridate, or potassium rhodium oxalate. Use of these compounds may also provide at least part of the halogen component, particularly by adding an acid, such as hydrogen chloride. In addition, the impregnation can occur after calcination of the support.

Similarly, the group IIIA metal may be incorporated in the support in any suitable manner, such as coprecipitation, ion-exchange or impregnation. A preferred method of preparing the catalyst can involve impregnating a porous carrier material with a soluble, decomposable group IIIA compound. As an example, an indium metal may be added by an impregnating aqueous solution of indium chloride ($InCl_3$) or indium nitrate ($In(NO_3)_3$) and hydrochloric acid. Use of these compounds may also provide at least part of the halogen component.

The promoter, such as a group IVA metal, may be incorporated in the catalyst in any suitable manner to achieve a homogeneous dispersion, such as by coprecipitation with the porous carrier material, ion-exchange with the carrier material, or impregnation of the carrier material at any stage in the preparation. One method of incorporating the group IVA metal component into the catalyst composite involves the utilization of a soluble, decomposable compound of a group IVA metal to impregnate and disperse the metal throughout the porous carrier material. The group IVA metal component may be impregnated either prior to, simultaneously with, or after the other components are added to the carrier material. Thus, the group IVA metal component may be added to the carrier material by comingling the carrier material with an aqueous solution of a suitable metal salt or soluble compound such as stannous bromide, stannous chloride, stannic chloride, or stannic chloride pentahydrate; or germanium oxide, germanium tetraethoxide, or germanium tetrachloride; or lead nitrate, lead acetate, or lead chlorate. The utilization of metal chloride compounds may also provide at least part of the halogen component. In one preferred embodiment, at least one organic metal compound such as trimethyltin chloride and/or dimethyltin dichloride are incorporated into the catalyst during the peptization of the inorganic oxide binder, preferably during peptization of alumina with hydrogen chloride or nitric acid.

Other promoters such as rhenium; a rare earth metal, such as cerium, lanthanum, and/or europium; phosphorus; nickel; iron; tungsten; molybdenum; titanium; zinc; cadmium; or a combination thereof can be added to the carrier material in any suitable manner during or after its preparation or to the catalytic composite before, during or after other components are incorporated.

With respect to the halogen component, the halogen component can be added with one or more of the metals and/or one or more promoters. Furthermore, the halogen component can be adjusted by employing a halogen-containing compound, such as chlorine or hydrogen chloride, in an air or an oxygen atmosphere at a temperature of about 370-about 600° C. Water may be present during the contacting step in order to aid in the adjustment.

The components can be impregnated together, e.g., co-impregnated, or separately with one or more optional calcination steps there-between. As discussed above, a catalyst precursor can be calcined in separate steps between impregnations. In one preferred embodiment, the group IIIA element, preferably indium, is impregnated and calcined at least about 700° C., desirably about 700-about 900° C. Although not wanting to be bound by theory, it is believed that the high temperature calcination can create reducing elements at various charge states.

The amount of material contained by the catalyst can be determined by methods known to those of skill in the art. As an example, UOP method 274-94 can be used for platinum and other group VIII metals, UOP method 303-87 can be used for tin and other group IVA metals, and UOP method 873-86 can be used for noble metals and modifiers, particularly indium, in catalysts by inductively coupled plasma atomic emission spectroscopy. The halogen component, particularly chloride, can be determined by UOP method 979-02 by x-ray fluorescence or by UOP method 291-02 by potentiometric titration. The amount of species by oxidation number and coordination number can be determined by x-ray absorption fine structure (hereinafter may be abbreviated "XAFS") or EXAFS following procedures discussed in the "Report of the International XAFS Society Standards and Criteria Committee by D. E. Sayers (adopted Jul. 25, 2000).

The catalyst embodiments disclosed herein can be used in a variety of hydroconversion processes. Exemplary catalytic naphtha reforming or reforming units can include continuous catalyst reaction and regeneration vessels. Exemplary units are disclosed in, e.g., U.S. Pat. No. 5,958,216; U.S. Pat. No. 6,034,018; and US 2006/0013763 A1. Another exemplary unit is disclosed in U.S. application Ser. No. 12/104,482 filed Apr. 17, 2008.

ILLUSTRATIVE EMBODIMENTS

The following examples are intended to further illustrate the subject particle(s). These illustrative embodiments of the invention are not meant to limit the claims of this invention to the particular details of these examples.

Example 1

Nine samples are made with varying orders of impregnation and optionally calcination at a temperature of at least about 750° C. in air (abbreviated "HiT") on the base or between metal impregnations. Samples 1 and 6 are made with a high temperature calcination of 865° C. between the indium and the platinum impregnations.

The supports are made by an oil drop method followed by standard heat treatment procedures. Tin is incorporated into the aluminum sol such that the formed support contains about 0.30%, by weight, tin. The support of a Sample 7 is made in similar fashion except that indium chloride solution is added along with a tin-containing solution to the aluminum sol and co-gelled by the oil drop method. The indium is impregnated on the supports from an aqueous solution containing indium chloride or indium nitrate and hydrogen chloride. The platinum is impregnated onto the supports from an aqueous solution of chloroplatinic acid and hydrogen chloride. For the indium and platinum co-impregnations, an aqueous solution of the indium compound, chloroplatinic acid and HCl is used. All the samples are then oxidized in an air flow of about 1000 $hr^{-1}$ gas hourly space velocity (GHSV), at about 510° C. for 8 hours, while simultaneously injecting a hydrogen chloride solution and chlorine gas. The catalysts are reduced in a 425 GHSV mixture of nitrogen and 15%, by mole, hydrogen. The reduction temperature is about 565° C. and is held for two hours and the samples are tested at this temperature.

The samples are subjected to in-situ x-ray absorption fine structure (XAFS) scans. Also, the oxidation states in the samples are obtained by XAFS scans during an in-situ temperature programmed reduction study which is done by ramping from room temperature to 565° C. at 7.5° C./min. in 100%, by mole, hydrogen followed by a hold period at 565° C. for 30 min. Alternatively, the oxidation state can be determined once the sample returns to room temperature, as in Table 2.

EXAFS data reduction and analysis are performed using Athena software, which is an interactive graphical utility for processing EXAFS data. Athena is the graphical front end and interface with IFEFFIT and FEFFIT programs. The program IFEFFIT provides interactivity for EXAFS analysis, combines the analysis algorithms of AUTOBK and FEFFIT with a graphical display, and provides general data manipulation. The program FEFFIT also provides analysis of EXAFS data and fits experimental EXAFS spectra to theoretical calculations from the software program FEFF. At least some of these programs are primarily developed by the Consortium for Advanced Radiation Sources at the University of Chicago.

The EXAFS data are aligned to references collected simultaneously with each sample spectra and then averaged to increase the signal to noise ratio. The background noise is removed using standard procedures with an Rbkg or Nyquist frequency value of 1.3 Å, 1.0 Å, and 1.0 Å for respective the platinum, tin, and indium spectra. The Fourier transforms (FT) of the measured spectra are simultaneously modeled with a k-weight of 1, 2, and 3. The $\chi(k)$ spectra are Fourier transformed from 3.5 to 10 $Å^{-1}$, 3.0 to 11.0 $Å^{-1}$, and 3.0 to 8.0 $Å^{-1}$, for the respective platinum, tin, and indium edges. The Fourier transform figures are obtained with the data processed with a k-weight of 2. The theoretical models are constructed from FEFF software based on the crystal structures of Pt(0), Sn(0), In(0), PtSn, and $In_{0.05}Pt_{0.95}$ as provided by the Inorganic Crystal Structure Database numbers. The models are optimized for all three elements for each sample. The FTs are modeled from 1.3 to 4.0 Å, 1.0 to 4.0 Å, and 1.0 to 3.5 Å for the respective platinum, tin, and indium edges. The Fourier transform ranges and the modeled regions result in 13, 17, and 10 independent points per spectra for respective platinum, tin, and indium. The models contain 6, 10, and 7 variables for the platinum, tin, and indium, along with two variables (Pt—Sn/In distance and $\sigma^2$ values) which are constrained to be the same for all three edges. This constraint demands that the Pt—Sn/In signals in the platinum spectra are the same as the Sn—Pt and In—Pt signals in the respective tin and indium spectra. As required for a robust model, the number of variables in the model is less than the number of independent points in the measured spectra. The value for $S_0^2$ is held at 0.93±0.03, 1.00±0.04, and 1.06±0.08 for the platinum (determined from Pt(0)), tin (determined from $SnO_2$), and indium (determined from In(0)) spectra as determined from modeling the respective standards.

The following table depicts the methodology and final weight percents of metals and halogen component on each support.

TABLE 1

| Sample No. | 1 | 2 | 3 | 4 | 5 | 6 | 7 |
|---|---|---|---|---|---|---|---|
| Base Average Bulk Density (g/cc) | 0.58 | 0.58 | 0.58 | 0.57 | 0.57 | 0.69 | 0.59 |
| Base Formed | With Sn | With Sn | With Sn | With Sn | With Sn | With Sn | With Sn and In |
| HiT on Base | No | No | Yes | No | Yes | No | No |
| Impregnations | In, HiT, Pt | co In + Pt | co In + Pt | Im In | Im In | In, HiT, Pt | Im Pt |
| Wt. % Pt | 0.30 | 0.31 | 0.30 | 0 | 0 | 0.26 | 0.30 |
| Wt. % Sn | 0.30 | 0.30 | 0.30 | 0.30 | 0.30 | 0.30 | 0.29 |

TABLE 1-continued

| Sample No. | 1 | 2 | 3 | 4 | 5 | 6 | 7 |
|---|---|---|---|---|---|---|---|
| Mole % | | | | | | | |
| Sn(0) | 53 ± 2 | 44 ± 1 | 45 ± 1 | 28 ± 1 | 28 ± 1 | 45 ± 1 | 44 ± 1 |
| Sn(2+) | 25 ± 3 | 27 ± 2 | 24 ± 2 | 37 ± 2 | 33 ± 2 | 30 ± 2 | 26 ± 2 |
| Sn(4+) | 22 ± 3 | 29 ± 2 | 31 ± 3 | 35 ± 2 | 39 ± 2 | 25 ± 2 | 30 ± 3 |
| Wt. % In | 0.30 | 0.26 | 0.31 | 0.30 | 0.30 | 0.26 | 0.59 |
| Mole % | | | | | | | |
| In(1+) | 72 ± 1 | 96 ± 1 | 95 ± 1 | 100 | 100 | 67 ± 1 | 71 ± 1 |
| In(3+) | 28 ± 1 | 4 ± 1 | 5 ± 1 | 0 | 0 | 33 ± 1 | 29 ± 1 |
| Wt. % Cl⁻ | 1.05 | 1.50 | 1.06 | 0.94 | 0.95 | 1.04 | 1.22 |

Table Abbreviations:
In, HiT, Pt: Impregnation by indium followed by high temperature calcination then impregnation by platinum
co: Co-impregnation with, e.g., In and Pt
Im Xx: Impregnation with a metal such as In or Pt
Wt. % Final weight percent of metal or chloride in catalyst based on weight of catalyst In addition, several other measurements are made at room temperature of the seven samples above and two additional samples 8 and 9, as depicted in Table 2.

TABLE 2

| Sample No. | 1 | 2 | 3 | 4 | 5 | 6 | 7 | 8 | 9 |
|---|---|---|---|---|---|---|---|---|---|
| Base Average Bulk Density (g/cc) | 0.58 | 0.58 | 0.58 | 0.57 | 0.57 | 0.69 | 0.59 | 0.58 | 0.58 |
| Base Formed | With Sn | With Sn | With Sn | With Sn | With Sn | With Sn | With Sn and In | With Sn | With Sn |
| HiT on Base | No | No | Yes | No | Yes | No | No | No | No |
| Impregnations | In, HiT, Pt | co In + Pt | co In + Pt | Im In | Im In | In, HiT, Pt | Im Pt | co In + Pt | co In + Pt |
| Wt. % Pt | 0.30 | 0.31 | 0.30 | 0 | 0 | 0.26 | 0.30 | 0.30 | 0.29 |
| Wt. % Sn | 0.30 | 0.30 | 0.30 | 0.30 | 0.30 | 0.30 | 0.29 | 0.31 | 0.30 |
| Mole % | | | | | | | | | |
| Sn(0) | 47 ± 1 | 40 ± 1 | 44 ± 1 | 23 ± 1 | 24 ± 1 | 42 ± 1 | 43 ± 1 | 37 ± 2 | 38 ± 2 |
| Sn(2+) | 29 ± 2 | 29 ± 2 | 25 ± 2 | 35 ± 2 | 32 ± 2 | 31 ± 2 | 28 ± 2 | 28 ± 3 | 30 ± 3 |
| Sn(4+) | 24 ± 2 | 31 ± 3 | 31 ± 2 | 43 ± 2 | 44 ± 2 | 27 ± 2 | 30 ± 2 | 35 ± 4 | 32 ± 4 |
| Wt. % In | 0.30 | 0.26 | 0.31 | 0.30 | 0.30 | 0.26 | 0.59 | 0.27 | 0.65 |
| Mole % | | | | | | | | | |
| In(1+) | 66 ± 1 | 90 ± 1 | 89 ± 1 | 90 ± 1 | 64 ± 2 | 57 ± 1 | 66 ± 1 | 95 ± 1 | 74 ± 1 |
| In(3+) | 34 ± 1 | 10 ± 1 | 11 ± 1 | 10 ± 1 | 36 ± 2 | 43 ± 1 | 34 ± 1 | 5 ± 1 | 26 ± 1 |
| Wt. % Cl⁻ | 1.05 | 1.50 | 1.06 | 0.94 | 0.95 | 1.04 | 1.22 | 0.74 | 1.07 |

As exhibited in Tables 1 and 2, Samples 1 and 6 receive a high temperature calcination between the depositing of platinum and indium. Generally, the indium(3+) amounts are 28% in Sample 1 and 33% in Sample 6, by mole, with respect to the total moles of indium in Samples 1 and 6 as measured at 565° C. in Table 1. In addition, the tin(4+) amounts are 22% in Sample 1 and 25% in Sample 6, by mole, with respect to the total moles of tin in Samples 1 and 6 as measured at 565° C. in Table 1. At room temperature, the measurement of tin(4+) may exceed 25%, by mole, with respect to the total moles of tin, as exemplified by Example 6 at room temperature in Table 2. Also, the higher density of Sample 6 as compared to Sample 1 may also result in a higher concentration of Sn(2+) after heat treatment.

In addition, Samples 1 and 2 from Tables 1 and 2 are subjected to EXAFS scans to determine coordination numbers, which can be a measure of ordering and charge transfer. The coordination number for platinum-X signal (where X can be the support, platinum, or tin/indium) is the average number of X atoms at a given distance for all platinum atoms in the sample. Coordination numbers are also determined for tin and indium where X is, respectively, oxygen, tin, or platinum, and oxygen, indium, or platinum. These samples are compared to a reference having no indium. Particularly, Comparison Example 1 has 0.29 wt. % platinum, 0.28 wt. % tin, and 1.24 wt. % chloride.

The coordination numbers are determined by EXAFS scans made at the platinum, tin, and indium edges. Typically, a sample is purged with helium at room temperature. The tin and indium K-Edge spectra are collected sequentially in helium. Next, the temperature is ramped to 565° C. at 5° C./minute and alternating tin and indium spectra are collected. The sample is then held at 565° C. for 30 minutes. Afterwards, the sample is cooled to room temperature in hydrogen. The K-Edge spectra for tin and indium are collected sequentially at room temperature in hydrogen. The L3-Edge spectra for platinum is collected in a similar fashion.

The data modeling procedure refines models of platinum, tin, and indium spectra for each sample type simultaneously so platinum-tin/indium and tin/indium-platinum distances and disorder terms are constrained to the same values. As such, the tin signal in the platinum spectra is the same distance as the platinum signal in the tin spectra.

The results are depicted in Table 3 below:

TABLE 3

COORDINATION NUMBER

| Pt spectra | Comparison Example 1 | Sample 1 (with heat treatment) | Sample 2 (without heat treatment) | Description |
|---|---|---|---|---|
| Pt-support | 0.9 ± 4 | 1.0 ± 8 | 0.9 ± 4 | Support |
| Pt-Pt | 2.0 ± 4 | 2.5 ± 4 | 2.5 ± 4 | PtSn/In particles |
| Pt-Sn/In | 1.6 ± 2 | 2.0 ± 3 | 2.0 ± 3 | PtSn/In particles |
| Sn spectra | | | | |
| Sn-O | 2.7 ± 2 | 2.6 ± 4 | 2.9 ± 3 | $SnO_2$ |
| Sn-O | 0.2 ± 2 | 1.5 ± 3 | 1.0 ± 4 | SnO |
| Sn-Sn | 1.7 ± 2 | 1.6 ± 1.2 | 1.3 ± 6 | $SnO_2$ |
| Sn-Pt | 1.4 ± 3 | 0.7 ± 3 | 1.3 ± 6 | PtSn/In particles |
| In spectra | | | | |
| In-O | NDV | 2.4 ± 2 | 0.7 ± 3 | $In_2O_3$ |
| In-In | NDV | 1.5 ± 3 | NDV | $In_2O_3$ |
| In-Pt | NDV | 0.17 ± 6 | NDV | PtSn/In particles |

NDV- no detectable value

The depicted data error data is with respect to the last significant digit(s). In Sample 1, the heat treated sample can have a tin-platinum coordination number of 0.7 with an error of ±0.3, which is no more than 1.0. In marked contrast, Sample 2 and Comparison Example 1 can have tin-platinum coordination numbers greater than 1.0. Similarly, Sample 1 can have an indium-platinum coordination number of 0.17±0.06, which can indicate the presence of a covalent bond between the indium and platinum. Sample 2, which is not heat-treated, does not exhibit evidence of such a bond. Also, both Samples 1 and 2 have similar number of platinum-tin/indium bonds. Although not wanting to be bound by theory, this suggests that high temperature may facilitate replacement of tin with indium within the platinum particles.

Example 2

Samples 1 and 3 are tested in a pilot plant under substantially the same conditions, e.g., feed, temperature, pressure, hydrogen/hydrocarbon molar ratio, and liquid hourly space velocity, for converting a hydrocarbon feed. An accelerated stability test is performed with a research octane number (RON) calculated by gas chromatograph analysis of a target 104. This target is held constant over time by continually raising the temperature. The activity of each catalyst is determined by the temperature needed to maintain the target octane. Yields are calculated based on on-line gas and liquid effluent gas chromatograph analyses. Data is used that depicts material balances between 98-102%. All results are shown at 0.056 meter-cubed of feed per liter of catalyst. The results are depicted in Table 4 below:

TABLE 4

| Properties | Sample 1 | Sample 3 |
|---|---|---|
| RON | 103.9 | 104.0 |
| Conversion Temperature ° C. | 520.5 | 524.2 |
| C5+ Yield, wt. % | 87.41 | 87.39 |

Sample 1 catalyst has more activity by 3.9° C. as compared to the Sample 3 catalyst.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reforming catalyst, comprising:
    A) indium wherein at least about 25%, by mole, of the indium is an In(3+) species and no more than about 2% by mole, of the indium is in a In(0) metallic state, based on the total moles of indium after exposure for about 30 minutes in an atmosphere comprising about 100% hydrogen, by mole, at a temperature of about 565° C.;
    B) tin wherein no more than about 25%, by mole, of the tin is a Sn(4+) species based on the total moles of tin after exposure for about 30 minutes in an atmosphere comprising about 100% hydrogen, by mole, at a temperature of about 565° C.; and
    C) a catalytically effective amount of a group VIII element to catalyze at least one reforming reaction.

2. The reforming catalyst according to claim 1, wherein the group VIII element comprises platinum.

3. The reforming catalyst according to claim 2, wherein the reforming catalyst comprises about 0.01-about 2%, by weight, of platinum based on the weight of the reforming catalyst.

4. The reforming catalyst according to claim 1, wherein the reforming catalyst comprises about 0.01-about 2%, by weight, of the group VIII element based on the weight of the reforming catalyst.

5. The reforming catalyst according to claim 1, further comprising about 0.1-about 10%, by weight, of a halogen component based on the weight of the reforming catalyst.

6. The reforming catalyst according to claim 1, further comprising a support, wherein the support comprises at least one of an alumina, magnesia, titania, zirconia, chromia, zinc oxide, thoria, boria, ceramic, porcelain, bauxite, silica, silica gel, silicon carbide, clay, crystalline zeolitic aluminosilicate, and non-zeolitic molecular sieve.

7. The reforming catalyst according to claim 1, further comprising a support, wherein the support comprises an alumina.

8. A reforming catalyst, comprising:
    A) tin wherein at least about 45%, by mole, of the tin is a Sn(0) species and no more than about 30%, by mole, of the tin is a Sn(4+) species based on the total moles of tin after exposure for about 30 minutes in an atmosphere comprising about 100% hydrogen, by mole, at a temperature of about 565° C.

9. The reforming catalyst according to claim 8, further comprising:
    a catalytically effective amount of a group VIII element to catalyze at least one reforming reaction.

10. The reforming catalyst according to claim 9, further comprising:
    an effective amount of a group IIIA element to catalyze at least one reforming reaction.

11. The reforming catalyst according to claim 10, wherein the group IIIA element comprises indium.

12. The reforming catalyst according to claim 9, wherein the group VIII element comprises platinum.

13. The reforming catalyst according to claim 8, further comprising about 0.1-about 10%, by weight, of a halogen component based on the weight of the reforming catalyst.

14. The reforming catalyst according to claim 8, further comprising a support, wherein the support comprises an alumina.

15. The reforming catalyst according to claim 8, wherein at least about 50%, by mole, of the tin is a Sn(0) species and no more than about 25%, by mole, of the tin is a Sn(4+) species based on the total moles of tin.

16. A reforming catalyst, comprising:
  A) a catalytically effective amount of a group VIII element to catalyze at least one reforming reaction;
  B) an effective amount of a group IVA element; and
  C) an effective amount of a reducing element wherein the coordination number of reducing element and the group VIII element is greater than 0 as determined at room temperature after exposure to an atmosphere of about 100%, by mole, hydrogen at a temperature of about 565° C.

17. The reforming catalyst according to claim 16, wherein the reducing element is at least one of indium, iron, chromium, cobalt, nickel, lead, cadmium, thallium, selenium, and europium.

18. The reforming catalyst according to claim 16, wherein the group IVA element is tin.

19. The reforming catalyst according to claim 18, wherein the group VIII element comprises platinum and the reducing element comprises indium.

20. The reforming catalyst according to claim 19, wherein the indium-platinum coordination number is greater than about 0.1 and the tin-platinum coordination number is no more than about 1.0.

* * * * *